United States Patent [19]
Gracey

[11] Patent Number: 5,727,295
[45] Date of Patent: Mar. 17, 1998

[54] OUTSIDE NECK SHAVER

[76] Inventor: Doyle D. Gracey, P.O. Box 155, Tehachapi, Calif. 93581

[21] Appl. No.: 574,277

[22] Filed: Dec. 18, 1995

[51] Int. Cl.$^6$ ............................ B21K 21/04; B23P 15/22
[52] U.S. Cl. .................... 29/1.32; 82/113; 86/10; 86/23
[58] Field of Search .............. 29/1, 3, 1.31, 1.32; 82/113, 131; 86/10, 23, 33

[56] References Cited

U.S. PATENT DOCUMENTS

| | | |
|---|---|---|
| 3,705,515 | 12/1972 | Lee ............................ 29/1.3 |
| 3,818,563 | 6/1974 | Bealieu ....................... 29/1.32 |
| 4,653,157 | 3/1987 | Alexander .................. 29/1.32 |
| 4,686,751 | 8/1987 | Gracey ........................ 29/1.32 |
| 4,742,606 | 5/1988 | Burby et al. ................ 29/1.32 |
| 4,813,827 | 3/1989 | Dugger ....................... 29/1.32 |
| 5,497,539 | 3/1996 | Blodgett et al. ............ 29/1.32 |

*Primary Examiner*—P. W. Echols
*Attorney, Agent, or Firm*—Kenneth G. Pritchard

[57] ABSTRACT

A shaver for cartridge casenecks indexes on the shoulder of the case and permits a rotating cutter assembly to shave the neck of cartridge cases while a pilot end from the same shaft rotating the cutter assembly supports the caseneck.

6 Claims, 2 Drawing Sheets

OUTSIDE NECK SHAVER

BACKGROUND OF THE INVENTION

1. Field of the Invention

This invention relates to devices which resize and re-dimension new or spent cartridge cases, including reducing the thickness of the neck of the cartridge case. Specially, this invention pertains to cartridge case trimmers that trim the outside neck of cartridge cases by shaving the neck while the cartridge case is held by hand.

2. Description of the Prior Art

Cartridge cases are produced in large numbers. This gives both production and cost efficiency. As part of this process the necks of the cartridge cases are produced with uniform thickness. Casenecks are normally reamed when cases are downsized because the case is forced to match outside dimensions and then reamed so the bullet will fit. The caseneck is then cut off to form a flat surface ring around the open end of the cartridge caseneck. When a cartridge is fired, the case expands and in particular the cartridge neck expands as the bullet is released due to the internal pressure. The entire case is reshaped and the stretched metal of the neck is converted into extra length of the cartridge caseneck. The length is then cut off to the required length and the cartridge is reused. In general the thickness of the cartridge caseneck is about 0.015 inches which is an industry standard.

There is a problem with these methods of manufacture and reusing cartridge cases. The problem is that the outside diameters of the caseneck at the open end does not need to be as strong as the wall of the body. This unneeded strength delays the release of the bullet and consumes energy to expand the caseneck to release the bullet. If the wall thickness of the caseneck is reduced, then less energy is needed to expand the caseneck and the bullet is released faster with more of the energy available to propel the bullet.

This reduction of the thickness has historically been a custom job performed on the cartridge by holding it at the primer end and turning the neck by bringing a cutter to the neck of the cartridge. This process frequently causes the neck to not be concentric with the body. The cartridge will wobble as it rotates and as the cutter touches the neck this wobble can cause uneven thickness of the caseneck wall.

If the caseneck wall is not of uniform thickness, one side will release before the rest of the caseneck causing the bullet to be accelerated to one side against the chamber and the gun barrel. While the gun barrel and its rifling will correct the path of the bullet, excessive wear of the barrel will occur. Even though the barrel corrects the path of the bullet there is still some residual effect whether tumble or change of spin that results in the bullet deviating from the aimed path. This will result in a wide spread of shots around the aimed path.

There are no known devices which shave or turn casenecks while holding the cartridge.

Accordingly it is an object of the present invention to reshape the outside diameter of the caseneck by shaving it while supporting the cartridge case by the open caseneck.

SUMMARY OF THE INVENTION

In the preferred embodiment of this invention, a base has a bearing housing and case holder housing mounted on the base. The bearing housing supports a shaft. The shaft is attached to a crank or motor at one end. The shaft extends into the case holder housing. The axis of the shaft is aligned to be on the same line as the axis of the case holder housing. The far end, called pilot end, of the shaft from the crank or motor has an outside diameter that is the same as or slightly less than the inside diameter of a cartridge caseneck to be shaved.

The pilot end is inserted into the cartridge caseneck supporting the caseneck while a cutter assembly on the rotating shaft shaves the caseneck as the cartridge is inserted into the cartridge case holder.

DESCRIPTION OF THE PREFERRED EMBODIMENT

Figure 1:
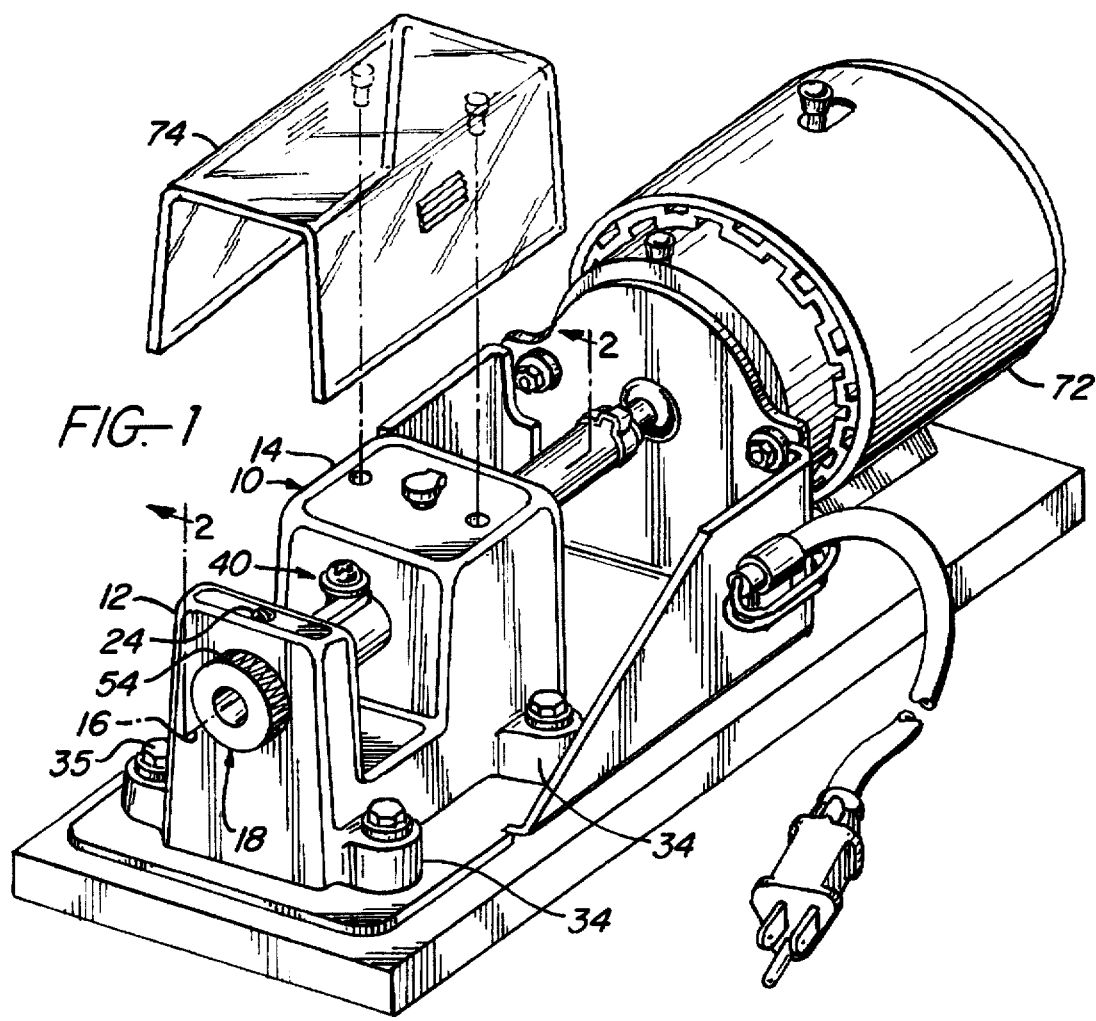
FIG. 1 is a perspective view of the present invention.

FIG. 1 shows a base 10, which may be a block of cast or machined metal such as aluminum. Attached to base 10 either by casting or other suitable means is a cartridge case holder housing 12 and a bearing housing 14 which are axially aligned with each other along axis 16 as shown. Within case holder housing 12, a case holder 18 is mounted. A set screw 24 may be used to lock case holder 18 in position. Within bearing housing 14, a bearing 26 is mounted in any of the known ways to mount a bearing. Base 10 has ears 34 for bench bolts 35. Ears 34 may be shaped as desired. Bench bolts 35 allow base 10 to be rigidly mounted to a bench or other working platform.

Figure 2:
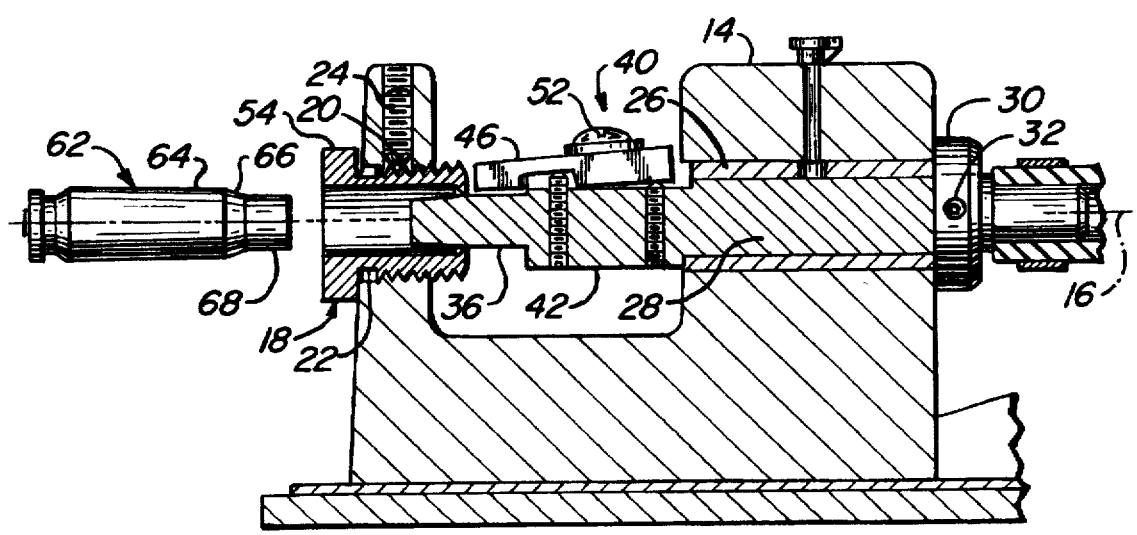
FIG. 2 is a cutaway view of a case holder of the present invention.

In FIG. 2 a cross sectional view of case holder 18 is shown. Threads 20 are shown on case holder 18 which are matched to threads 22 of case holder housing 12. Threads 20 and 22 permit case holder 18 to be set with great precision. In addition to mounting threads 20, a knurled surface grip 54, also shown in FIG. 1, may be added for ease in screwing case holder 18 into or out of case holder housing 12. A shaft 28 is mounted within bearing 26 and held in place by a shaft retainer 30 via a set screw 32, such that it is free to rotate. Shaft retainer 30 may be changed for any means for holding shaft 28 in place. As shaft 28 wears within bearing 26, adjusting shaft retainer 30 forward will maintain a snug fit. If shaft 28 is a harder substance than bearing 26, it is bearing 26 that wears away.

Shaft 28 has a cutter assembly 40 mounted on shaft 28. Cutter assembly 40 commences a fixed distance from end 36 of shaft 28 that is axially inserted along axis 16 into case holder housing 12. Cutter assembly 40 has a support 42 which can be made by just increasing the diameter of one portion of shaft 28 or by mounting a collar around a portion of shaft 28. Two set screws 44 are placed above axis 16 of shaft 28. A cutter 46 with a cutting edge 48 and balance points 50 is then placed on set screws 44 which have a spacing which matches balance points 50. Cutter 46 is held in place by a button head screw 52 or any other appropriate fasteners.

End 36 is a pilot end with an outside diameter the same or just slightly smaller than the inside caseneck diameter of a predetermined cartridge size.

Figure 3:
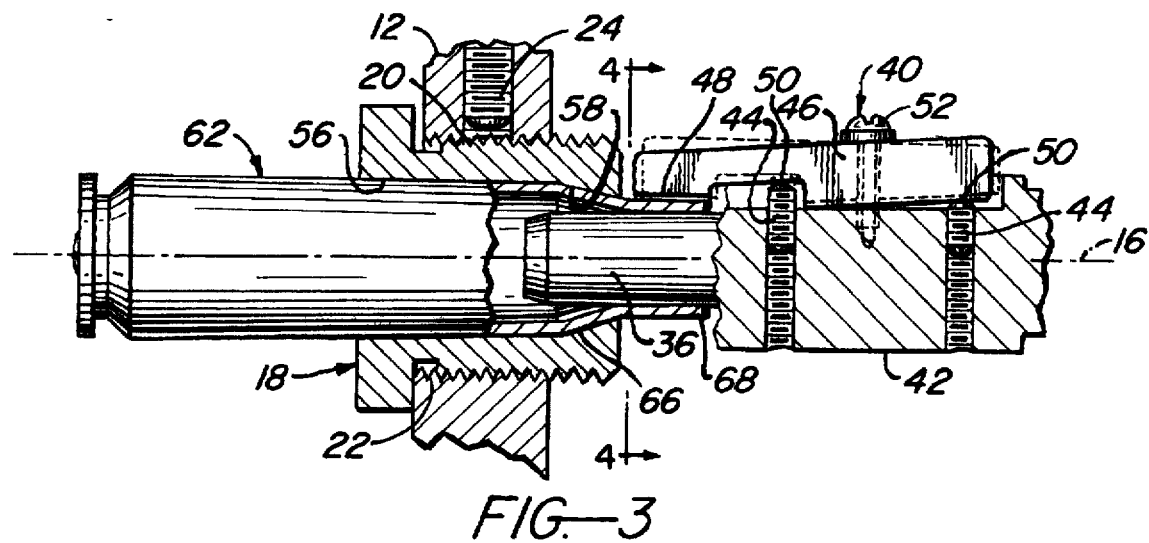
FIG. 3 is an enlarged a side view with partial cutaway showing a cartridge casement being shaved.

FIG. 3 is a cutaway view of the present invention in use. Along axis 16, case holder 18 has an opening which is shaped to match a given cartridge case's external dimensions. This includes a segment 56 which accommodates the body of a cartridge and tapered surface 58 which is a shoulder stop preventing further insertion of a cartridge. A typical cartridge case 62 has a main body 64 and has tapered surface 66 that fits within tapered surface 58 of case holder 18. The length of segment 56 should be sufficiently shorter than body 64 so that enough of cartridge case 62 extends to hold by hand or other holding means. When cartridge case 62 is inserted into case holder 18 pilot end 36 is inserted into cartridge case 62. Pilot end 36 must be less in length than cartridge case 62. This restriction assured that caseneck 68 of cartridge case 62 extends from case holder 18 when cartridge case 62 is fully inserted. With pilot end 36 within caseneck 68 there will be no wobble or bending. In fact, all of cartridge case 62 within case holder 18 is firmly supported to keep body 64 and caseneck 68 concentric.

Figure 4:
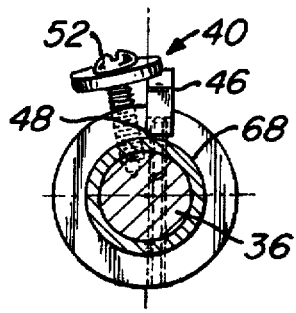
FIG. 4 is a cutaway view taken at line 4—4 in FIG. 3.

Referring to FIG. 1 and to FIG. 4 which is an end view, it can be seen that caseneck 68 is brought to cutting edge 48. Shaft 28 is rotated either by a crank 70 or a motor 72. Motor 72 may be any power drive. The void between bearing housing 14 and case holder housing 12 may be covered by a clear plastic cover 74. Cover 74 prevents injury to users caused by small chips of metal thrown by cutter assembly 40.

FIGS. 3 and 4 show the present invention in use. Cutter assembly 40 is adjusted so cutting edge 48 is parallel to pilot end 36 at a distance equal to the desired thickness of caseneck 68, say 0.012 inches. As cartridge case 62 is inserted into cartridge case holder 12, body 64 and tapered surface 66 are completely encased by case holder 18 to the depth of case holder 18. Caseneck 68 just fits over pilot end 36 which provides rigid support to caseneck 68. Cutting edge 48 shaves metal from caseneck 68 as cartridge case 62 is inserted into cartridge case holder 18. Because of how everything is supported in position, caseneck 68 is shaved a uniform amount on all sides.

Figure 5:
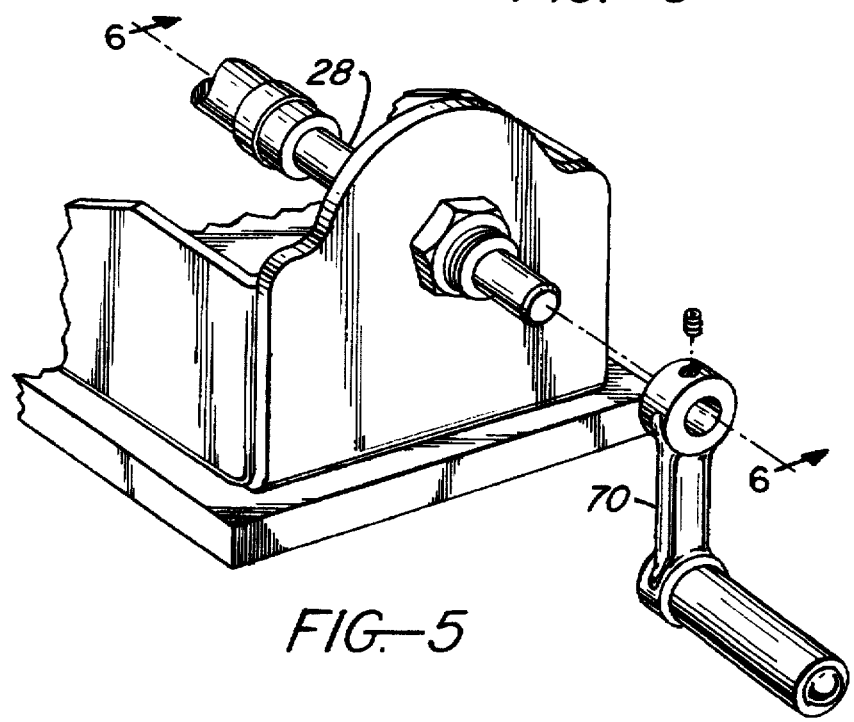
FIG. 5 is a perspective view of an alternate means of power.

FIG. 5 shows a crank 70 used instead of a motor to rotate cutter 40 via shaft 28.

Figure 6:
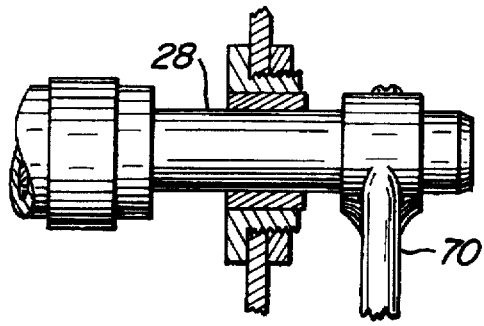
FIG. 6 is a side cutaway view of FIG. 5, taken at line 6—6 of FIG. 5.

FIG. 6 is a cutaway along line 6—6 which shows a typical mount for shaft 28.

What is claimed is:

1. An outside neck shaver for cartridge cases with a predetermined inside caseneck diameter comprising:

a base;

a bearing housing mounted to said base;

a shaft inserted into said bearing housing such that one end of said shaft extends from one side of said bearing housing and the other end of said shaft with an outside diameter no greater than the inside diameter of said predetermined inside caseneck diameter extends from the other side of said bearing housing;

a case holder housing mounted to said base with an opening axially aligned with said shaft and having said outside diameter shaft end which is no greater than said predetermined inside caseneck diameter inserted within said case holder housing along said axis;

a cartridge case holder mounted within said case holder housing and axially aligned around said inserted shaft and with an opening shaped to match said cartridge case's external dimensions and a shoulder stop for indexing on the shoulder of said cartridge case;

means for turning said shaft; and a cutter assembly mounted on said shaft, said cutter assembly further comprising a cutter with a single cutting edge, said cutter mounted on said shaft such that said cutting edge is parallel to said shaft and spaced from the shaft a distance equal to the desired caseneck wall thickness, and said cutting edge is next to said shoulder of said cartridge case holder such that when a cartridge case is inserted into the cartridge case holder that any portion of the outside caseneck wall that does not fit between said shaft end and said cutter is shaved away.

2. An outside neck shaver for cartridge cases as described in claim 1 further comprising a guard mounted over said cutter assembly to catch any shavings thrown off by said cutter.

3. An outside neck shaver for cartridge cases as described in claim 1 where said turning means is a hand crank.

4. An outside neck shaver for cartridge cases as described in claim 2 where said turning means is a hand crank.

5. An outside neck shaver for cartridge cases as described in claim 1 where said turning means is a motor.

6. An outside neck shaver for cartridge cases as described in claim 2 where said turning means is a motor.

* * * * *